United States Patent [19]
Sloey et al.

[11] Patent Number: 6,086,388
[45] Date of Patent: Jul. 11, 2000

[54] AUXILIARY SWITCH SYSTEM FOR USE WITH REMOVABLE CIRCUIT BREAKER

[75] Inventors: Jason S. Sloey, Milpitas; Richard J. Middlehurst, Fremont, both of Calif.

[73] Assignee: TVM Group, Inc., Fremont, Calif.

[21] Appl. No.: 09/072,500

[22] Filed: May 5, 1998

[51] Int. Cl.[7] .................................................. H01R 25/00
[52] U.S. Cl. ........................................ 439/110; 361/636
[58] Field of Search ................................... 439/110, 113, 439/114, 94, 496, 477, 59, 61, 119, 77, 78, 79, 81, 82, 716; 361/636, 637, 638, 639, 640, 633, 634, 673, 648, 649, 650, 614, 647, 656

[56] References Cited

U.S. PATENT DOCUMENTS

| | | | |
|---|---|---|---|
| 4,824,391 | 4/1989 | Ii ............................................... | 439/329 |
| 5,037,332 | 8/1991 | Wilson ...................................... | 439/608 |
| 5,439,396 | 8/1995 | Magdaleno ............................... | 439/716 |
| 5,726,852 | 3/1998 | Trifiletti et al. .......................... | 361/115 |
| 5,745,338 | 4/1998 | Bartolo et al. ........................... | 361/637 |
| 5,788,510 | 8/1998 | Walker ..................................... | 439/61 |

OTHER PUBLICATIONS

Product brochure, *"Engineers Design and Build,"* Heinemann Electric Canada, Jun. 1996.
Product brochure, *"Heinemann Control Panel Solutions,"* Heinemann Electric Canada, Sep. 1996.

*Primary Examiner*—Paula Bradley
*Assistant Examiner*—Ross Gushi
*Attorney, Agent, or Firm*—Flehr Hohbach Test Albritton & Herbert LLP

[57] ABSTRACT

An auxiliary terminal connector adapted for use with a circuit breaker panel into which one or more pluggable circuit breakers are plugged comprises a support base which supports one or more electrically conducting bus connectors. Each bus connector corresponds to a pin from each set of signaling connector pins of the pluggable circuit breaker and is adapted to electrically connect together all these corresponding pins such that signals from them are conveniently bused together and can be accessed from a single or multiple positions on the auxiliary terminal connector. The bus connectors are tulip-shaped in cross section and are adapted to maintain good electrical contact with the signaling pins. They are made of resilient, electrically conducting material which provides a biasing component against the signaling pins when these are plugged in. Manufacturing tolerances and other deviations are accommodated by slits provided in portions of the bus connectors which permit some independence in the biasing of portions of the bus connectors against associated pins.

18 Claims, 5 Drawing Sheets

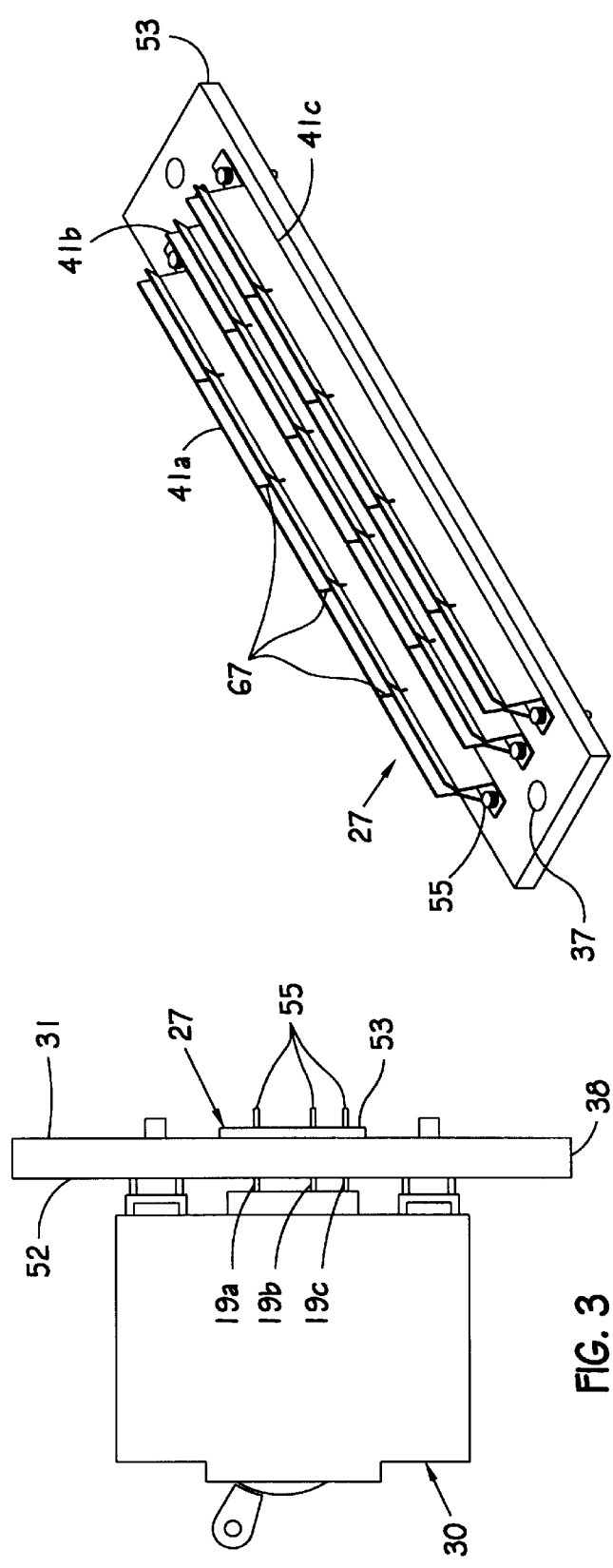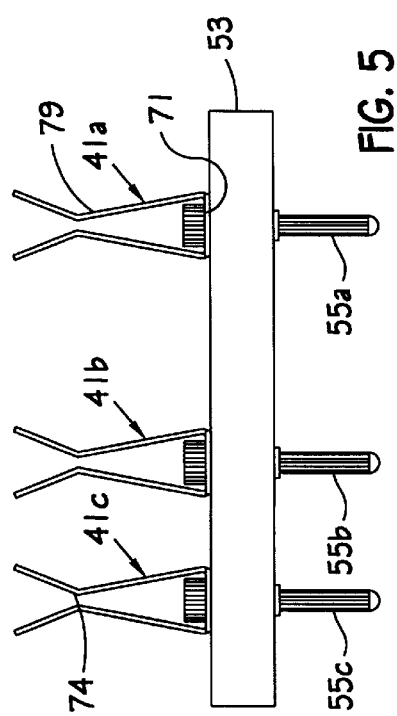

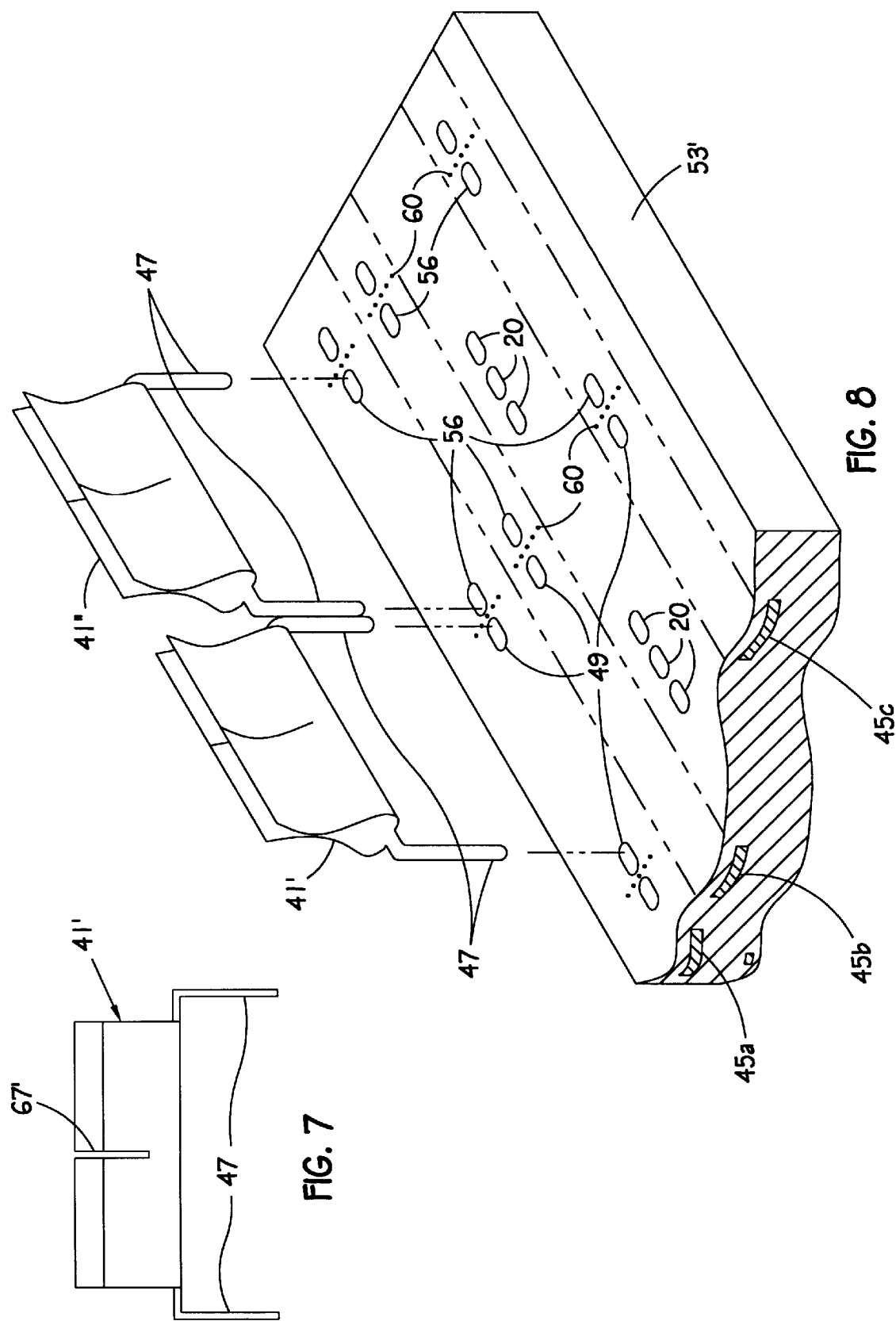

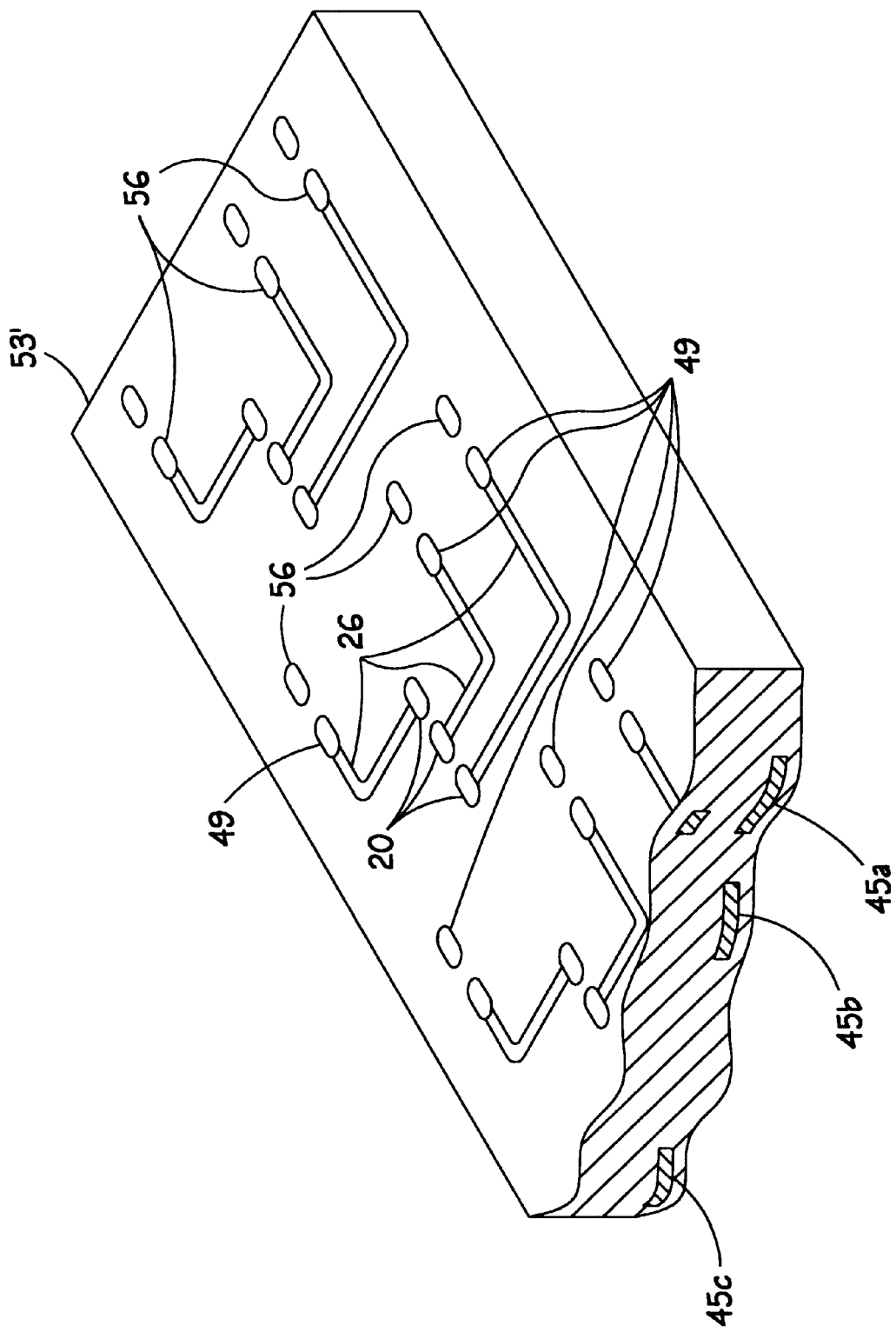

AUXILIARY SWITCH SYSTEM FOR USE WITH REMOVABLE CIRCUIT BREAKER

BACKGROUND OF THE INVENTION

1. Field of the Invention

The invention relates to circuit breakers, and more particularly, to pluggable circuit breaker power and signaling distribution connectors.

2. Description of Related Art

FIG. 1 illustrates a prior art pluggable circuit breaker 30 having two circuit breaker posts 32 (only one shown). To create a pluggable circuit breaker, internally threaded circuit breaker pins 34 are threaded onto each of the threaded circuit breaker posts 32. On the exterior of each circuit breaker pin 34 is attached a resilient electrical contact band 36. The electrical contact band 36 is typically a thin metallic band with resilient fingers having an arcuate configuration that extend outward from the circuit breaker pin outer diameter. The addition of the circuit breaker pins 34 with outer electrical contact bands 36 to the circuit breaker 30 allows for pluggability of the circuit breaker 30 into a circuit breaker panel (FIG. 2).

The circuit breakers of the prior art conventionally plug into a circuit breaker panel 40 as show in FIG. 2. However, one aspect of assembly and replacement of the circuit breaker system is unaddressed by the prior art and involves the signaling mechanism of the circuit breaker. Conventionally, after the circuit breaker 30 is in place in the circuit breaker panel, signaling connector pins 19a, 19b, 19c (19 collectively), which in operation are used to provide an indication of the status of the circuit breaker and/or whether the circuit breaker has been tripped, have to be individually wired in the manner contemplated by the particular application. For instance, in some applications, the signaling connector pins 19a of all the circuit breakers are electrically connected together, the signaling connector pins 19b are all connected together, and the signaling connector pins 19c are all connected together. When any circuit breaker(s) is (are) tripped, the signaling connector pins 19 from that circuit breaker provide an indication that a circuit breaker—which in such a wiring configuration is unidentifiable—has been tripped. Such a signal can be monitored at a remote location to provide an indication that the system needs servicing. In other applications, the signaling connector pins can be wired individually, such that the signaling connector pins 19 will give an indication of the status of each individual circuit breaker. In that situation, the particular tripped circuit breaker can be identified.

The actual wiring of the signaling connector pins 19 may be implemented by individually soldering the pins to connection wires, or by using press fit connectors that have to be individually applied to each signaling connector pin. In either of the above situations, the wiring process of the signaling connector pins becomes laborious and time consuming, and its complexity increases the chances of mis-wiring and other malfunctions. A need therefore arises to expedite the connection of the signaling leads of the circuit breakers to thereby save time and costs in the assembly and installation of circuit breaker panels.

SUMMARY OF THE INVENTION

The invention overcomes the shortcomings of the prior art by providing an auxiliary terminal connector which is adapted for use with a circuit breaker panel into which one or more pluggable circuit breakers each having a set of signaling connector pins is plugged. The term "pluggable" is used to signify that the components matingly engage each other such that at least a portion of one of the components is inserted into a corresponding portion of the other component preferably to complete an electrical path between the components. The auxiliary terminal connector is designed to facilitate circuit breaker pluggability by using the pluggability feature for the signaling connector pins. Using this invention, an operator assembling or servicing a circuit breaker panel needs only to plug each circuit breaker into the panel without having to perform the time consuming wiring of each of the signaling connector pins of each circuit breaker. Depending on the particular configuration of the auxiliary terminal connector in accordance with the invention, various information about the status of the circuit breakers—collectively, in predetermined groups, or individually—can be derived.

In on embodiment, the auxiliary terminal connector comprises a support base which supports one or more electrically conducting bus connectors. Each bus connector corresponds to a pin from each set of signaling connector pins of a pluggable circuit breaker and is adapted to electrically connect together a set of these corresponding pins such that signals from them are conveniently bused together and can be accessed from a single or multiple positions on the auxiliary terminal connector. A connector may be used at any of these locations to electrically connect the bus connectors to a remote location for indicating the status of the circuit breakers.

In one embodiment, the bus connectors are tulip-shaped in cross section and are adapted to provide a generous target area for the signaling connector pins and to maintain good electrical contact therewith. They are constructed from resilient, electrically conducting material which provides a biasing force against the signaling pins when these are plugged in. Manufacturing tolerances and other deviations are accommodated by slits provided in portions of the bus connectors which permit some independence in the biasing of portions of the bus connectors against associated pins.

In accordance with another embodiment, the invention provides for individual wiring of the circuit breakers such that each circuit breaker can be monitored separately. Each circuit breaker is provided with a corresponding dedicated auxiliary terminal connector for interfacing the pluggable circuit breaker with an associated plug-in connector. The dedicated auxiliary terminal connector comprises a housing having at least one contact structure therein. Each contact structure is associated with a corresponding signaling pin and a corresponding wire pin and is adapted to provide electrical communication between these pins. The contact structures are of a resilient, electrically conducting material and are configured to maintain, through appropriate biasing, good electrical contact with the associated pins.

BRIEF DESCRIPTION OF THE DRAWINGS

Many objects and advantages of the present invention will be apparent to those skilled in the art with a reading of this specification in conjunction with the attached drawings, wherein like reference numerals are applied to like elements and wherein:

FIG. 3 is a schematic side view of the auxiliary terminal connector of the invention as used with a circuit breaker and panel;

FIG. 4 is a perspective view of the auxiliary terminal connector of the invention;

FIG. 5 is a schematic side view of the auxiliary terminal connector of the invention along one dimension;

FIG. 6 is a schematic side view of the auxiliary terminal connector of the invention along a second dimension;

FIG. 7 is a schematic view of the bus connector in accordance with a second embodiment of the invention;

FIG. 8 is a perspective partial sectional view showing the front side of the auxiliary terminal connector in accordance with the second embodiment;

FIG. 9 is a perspective partial sectional view showing the rear side of the auxiliary terminal connector in accordance with the second embodiment.

DESCRIPTION OF THE PREFERRED EMBODIMENTS

Figure 1:
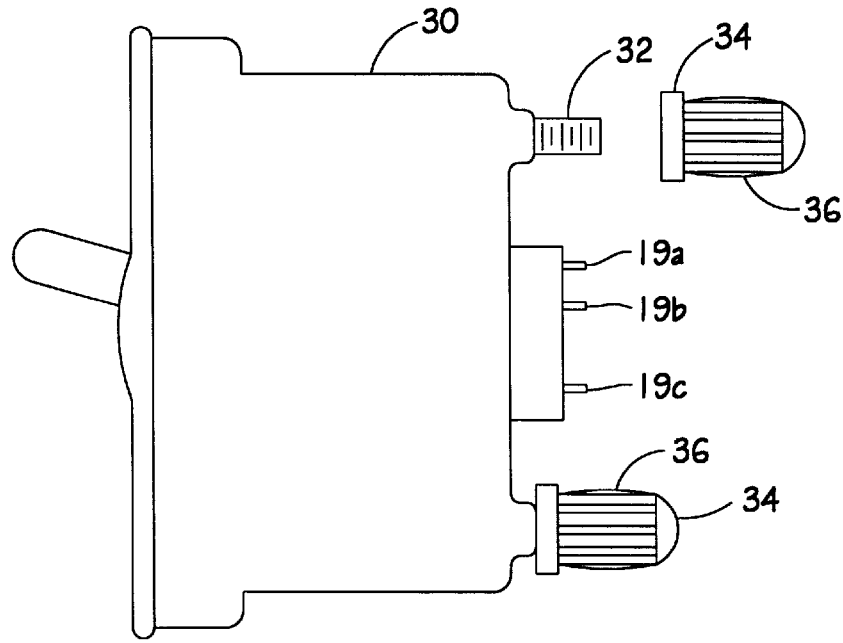
FIG. 1 is a schematic view of a conventional pluggable circuit breaker.
Figure 2:
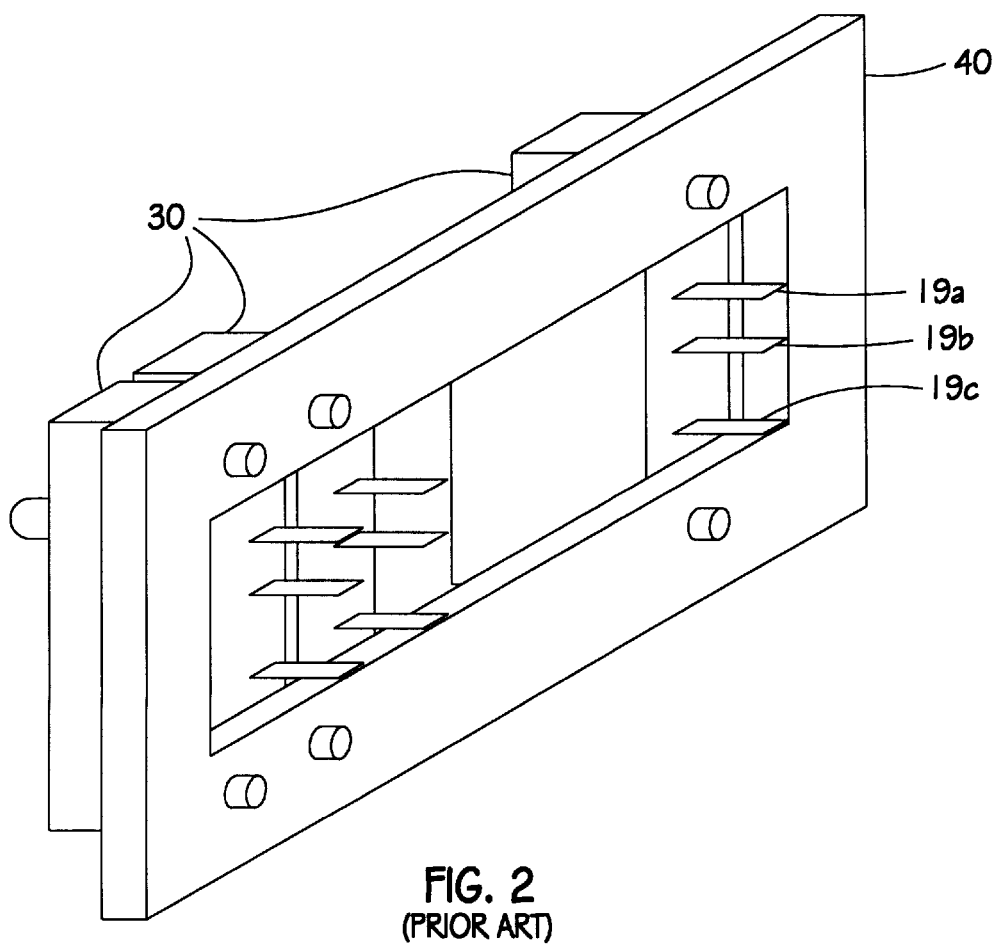
FIG. 2 is a perspective view schematically illustrating a circuit breaker panel of the prior art.

FIG. 3, illustrating an arrangement in accordance with the invention, shows a circuit breaker 30 plugged into circuit breaker panel 38. The panel 38 is designed to facilitate pluggability of circuit breaker 30 by providing an auxiliary terminal connector 27 for pluggably receiving signaling connector pins 19. Circuit breaker 30 plugs in at face 52 of the panel 38, while auxiliary terminal connector 27 is mounted on rear face 31 of the panel 38. Pins 19 are in communication with the auxiliary terminal connector 27 by extending toward the circuit panel 38. In this manner, all electrical connections between circuit breaker 30 and circuit breaker panel 38, including those of the signaling connector pins 19, are effected by pluggably mating the circuit breaker 30 to the panel 38 without resort to individual wiring of pins.

FIG. 4 is a perspective view of auxiliary terminal connector 27, which in operation may be secured to the back of circuit breaker panel 38. Any suitable means, such as screws passing through bore holes 37 drilled into support base 53, or fasteners such as locking tabs or clips (not shown), may be used to attach connector 27 to the panel 38. The attachment means, which may be provided principally on the auxiliary terminal connector 27 or on the panel 38, may be of a permanent nature, such as adhesive, or they may be configured to permit easy removal and replacement of the auxiliary terminal connector 27. Alternatively, it is contemplated that the auxiliary terminal connector 27 and the panel 38 may be manufactured integrally with one another such that detachment is precluded. Moreover, although the auxiliary terminal connector is shown in conjunction with the particular circuit panel 38 of the drawing figures, it is to be understood that the auxiliary terminal connector 27 can be produced as a stand alone unit or adapted for use in conjunction with other types of assemblies and panels.

As shown in FIG. 4, auxiliary terminal connector 27 comprises bus connectors 41a, 41b, 41c (41 collectively) which are disposed on electrically non-conducting support base 53 which serves to electrically isolate the bus connectors 41. Any suitable means may be used to affix the bus connectors 41 to the support base 53, including but not limited to adhesive or tabs or other fasteners (not shown). Bus connector pins 55, which may also provide attachment support of bus connectors 41 to support base 53, are conductive and operate to electrically connect the bus connectors 41 disposed on the front side of support base 53 to the rear side of the support base 53. Electrical connection may be effected using any means suitable for establishing a continuous electrical path from the bus connector 41 to bus connector pin 55. As best illustrated in FIGS. 5, 6 and 8, bus connector pins 55 may pass through support base 53 at one or both ends of the support base 53 (FIGS. 6 and 8), or at any point or points along the length thereof, and may be adapted to plug into a connector (not shown) wired to a remote location for indicating the status of the pluggable circuit breakers 30.

The bus connectors 41 are tulip-shaped in cross section and each comprises a base portion 71 and two lateral portions 79 (FIG. 5). Base portion 71 is fastened to the surface of support base 53 and lies flat thereagainst. Lateral portions 79 project obliquely from base portion 71, converging towards each other to form a contact portion then flaring out to form a V-shaped opening. The V-shaped opening provides a generous target area into which signaling connector pins 19 of circuit breaker 30 penetrate as the circuit breaker is plugged in. The convergence of the lateral portions 79 allows for a resilient inward pressure component of the bus connectors 41 which insures electrical contact with the signaling connector pins 19. To optimize contact with signaling connector pins 19, the separation between the lateral portions 79 at the point of maximum convergence is smaller than the thickness of the signaling connector pins 19.

Bus connectors 41 are provided with slits 67 whose number may be related to the number of circuit breakers 30 to be accommodated. The slits, best shown in FIG. 6, extend partially or completely down the width of the lateral portions 79 and afford some independence in the resiliency of different portions of each bus connector 41 in the longitudinal direction. Each portion is thus permitted to flex independently of the other portions, the independence permitting compensation for different sizes of the signaling connector pins 19 and for deviations in the positions of the pins 19 relative to the bus connectors 41, which may be due to manufacturing tolerances or to imprecise fitting and positioning of the different circuit breakers 30 in the circuit breaker panel 38. The slits may be provided on one or both lateral portions 79 of each bus connector 41 and may or may not be in corresponding relationship to each other when provided on both lateral portions of each bus connector.

Other means of attachment of the bus connectors to the support base are also contemplated. As shown in FIG. 7, the base portions of the bus connectors 41' may be extended and bent away from the body of the bus connectors to thereby form pins 47. These pins mate with corresponding holes, or vias, 49 formed in support base 53', as shown more clearly in FIG. 8. Support base 53' may be formed of an insulating material, such as FR4, capable of electrically isolating the bus connectors 41'. Three conductive strips 45a, 45b, and 45c (45 collectively) are formed in the support base 53', which essentially has a printed circuit board (PCB) configuration. The conductive strips 45 extend longitudinally along support base 53' and may be imbedded therein such that support base 53' serves to electrically insulate them. Each conductive strip corresponds to a signaling connector pin 19 of the pluggable circuit breakers 30. Along their lengths, conductive strips 45 are provided with vias 49 with which pins 47 from the bus connectors 41' mate. Such mating electrically connects the bus connectors 41' with the conductive strips 45 and soldering or other such electrical connection can be used to ensure good electrical contact. The bus connectors 41' may be made of any appropriate length to accommodate one or more circuit breakers each, and the vias 49 formed in the conductive strips and support base 53' are spaced accordingly. Placement of multiple bus connectors 41' per conductive strip 45 is thus contemplated, as seen in FIG. 8, which for purposes of clarity shows only two such bus connectors, 41' and 41", sharing conductive strip 45a.

Pins 47 extend into vias 49 formed in the base 53' to make electrical contact with traces 26 disposed substantially on the other side of base 53'. As FIG. 9 illustrates, each trace 26 is associated with a conductive strip 45 and is electrically connected thereto either by pins 47 passing through support base 53' or by virtue of the conductive lining of the vias themselves. Soldering of the pins 47 to the traces 26 ensures good electrical contact. Like conductive strips 45, the traces 26 are also embedded in the base 53' which serves to electrically insulate them. Traces 26 form a conductive path to an output region on support 53' where three output vias 20 are located. The output vias 20 operate to allow insertion of conductors or pins (not shown), in order to electrically wire the entire assembly to a remote location for signaling purposes and indication of the status of the pluggable circuit breakers.

Although as described above conductive strips 45a, 45b, and 45c extend over the length of the support base 53', it is contemplated that each of these strips may be segmented (i.e., each strip is not continuous along the length of the support base) such that groupings of circuit breakers may be wired separately for monitoring of the status of each group independent of the other groups. For instance, segments of the conductive strips 45a, 45b, and 45c corresponding to via 49 and bus connector 41' can be separate from the segments of the strips 45a, 45b, and 45c corresponding to vias 56 and bus connector 41". This separation is demarcated by dotted lines 60 in FIG. 8. Each group can consist of any number of circuit breakers, including one, to thereby enhance the pluggability of the circuit breaker(s) and reduce the effort and time required to connect them.

Grouping of more than one circuit breaker 30 per bus connector terminal 41 and segment of conductive strip 45 as described above does not permit the identification of the status of a particular circuit breaker in the group, but would rather only serve to indicate that at least one, unidentified circuit breaker in a group has changed status. For an alternative arrangement in which identification of the particular circuit breaker is possible, the arrangement of FIG. 10 is provided.

Figure 10:
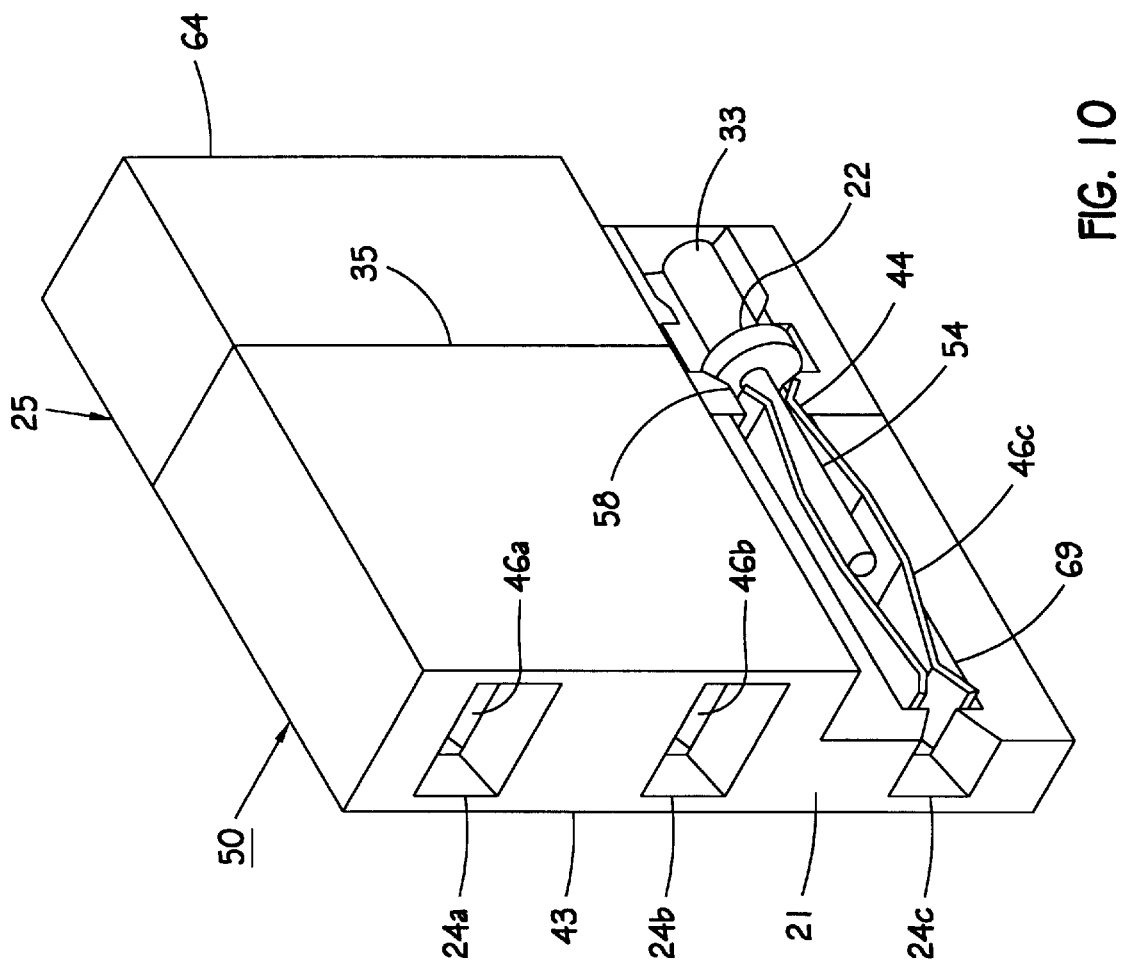
FIG. 10 is a perspective partial sectional view of a dedicated auxiliary terminal connector in accordance with a third embodiment of the invention.

The embodiment in accordance with FIG. 10 enables connection of individual circuit breakers 30 with dedicated signal wires to provide individual status indication for each circuit breaker. Each circuit breaker 30 is provided with an associated dedicated auxiliary terminal connector 50 which facilitates the individual connection of the circuit breakers 30 to status wires (not shown) connected to wire pins 54.

Each dedicated auxiliary terminal connector 50 engages the associated circuit breaker 30 by inserting signaling connector pins 19 of the circuit breaker 30 into corresponding front openings 24a, 24b, 24c (24 collectively) disposed in housing 43 of the dedicated auxiliary terminal connector 50. Front openings 24 are flared to provide a generous target area for the signaling connector pins 19 and provide the pins 19 with access to chambers 69 disposed in the housing 43 (only one chamber is shown). The chambers 69 each contain therein a corresponding contact structure (46a, 46b, 46c; 46 collectively) with which a signaling connector pin 19 mates upon passage through the flared front openings 24. Contact structures 46 extend substantially through the housing 43 to thereby provide for electrical communication between signaling connector pins 19 and wire pins 54, which access chambers 69 via rear openings 44. Housing 43 is formed of any electrically insulating material, while contact structures 46 are formed of any electrically conducting material and may comprise brass or copper clips having an intrinsic resilience biasing the clips inwardly to optimize contact with signaling connector pins 19 when the pins are inserted through the forward face 21 of housing 43 and with wire pins 54 when these are inserted through the rearward face 35 of housing 43. Like front openings 24, rear openings 44 are flared to present a generous target area to wire pins 54. It is to be understood that the number of front openings 24, rear openings 44, and contact structures 46 of each dedicated auxiliary terminal connector 50 is at least equal to the number of signaling connector pins 19 of each circuit breaker 30, although in some applications, for improved versatility of the dedicated auxiliary terminal connector 50, this number may exceed the number of signaling connector pins 19.

FIG. 10 also shows plug-in connector 25 comprising a housing 64 which holds pins 54. Signaling wires (not shown) are attached to pins 54 for example by crimping proximal end 33 to the signaling wires. As one of ordinary skill in the art will recognize, other terminations can be used such as solder tail, lugs, etc. Wire pins 54 are retained in position by a collar 22 and extend outwardly from housing 64 via openings 58. In operation, when plug-in connector 25 is plugged into dedicated auxiliary terminal connector 50, each wire pin 54 of plug-in connector 25 detachably mates with a corresponding contact structure 46 in the dedicated auxiliary terminal connector 50, as described above, to form a continuous electrical path between the signaling connector pins 19 and the signaling wires (not shown). In this manner, the signaling connector pins 19 of each circuit breaker are plugged into an associated dedicated auxiliary terminal connector 50, which dedicated auxiliary terminal connector 50 mates with a plug-in connector 25, to thereby permit individual remote monitoring of the status of each circuit breaker 30 through dedicated signaling wires.

Although described as discrete units, a plurality of dedicated auxiliary terminal connectors 50 may be integrally formed in groups. Such an arrangement would entail, for example, a side-by-side array of the dedicated auxiliary terminal connectors 50, or any electrically equivalent arrangement which would enable individual monitoring of the circuit breakers while preserving the pluggability advantages realized by the invention.

The above are exemplary modes of carrying out the invention and are not intended to be limiting. It will be apparent to those skilled in the art that modifications thereto can be made without departure from the spirit and scope of the invention as set forth by the following claims.

What is claimed is:

1. An apparatus for receiving a plurality of pluggable circuit breakers each having first and second circuit breaker posts and a signaling connector pin for permitting the status of the circuit breaker to be monitored, the apparatus comprising a circuit breaker panel adapted to receive the plurality of pluggable circuit breakers for permitting electrical power connections to the first and second circuit breaker posts, an auxiliary terminal connector and means for securing the auxiliary terminal connector to the circuit breaker panel, the auxiliary terminal connector having a support base provided with front and rear sides and an electrically conducting bus connector disposed substantially on the front side of the support base and adapted for pluggably receiving the signaling connector pin of each of the plurality of pluggable circuit breakers and electrical means electrically coupled to the bus connector for permitting remote monitoring of the status of the plurality of pluggable circuit breakers, the bus connector extending longitudinally along the support base and being tulip-shaped in cross section, the tulip shape having a base portion and two lateral portions extending from the base portion, the two lateral portions converging towards each other to form a contact portion and diverging from the contact portion to form a V-shaped opening at a predetermined distance from the base portion, the electrical means being provided with at least one electrically conducting bus connector pin extending from the bus connector through the support base so as to protrude from the rear side of the support base, whereby the signaling connector pins are electrically connected by the bus connector and the bus connector permits a solderless electrical connection to the signaling connector pins.

2. The assembly of claim 1, wherein at least one of the lateral portions of the bus connector is provided with a slit extending from the opening towards the base portion.

3. The apparatus of claim 1, wherein each circuit breaker has first, second and third signaling connector pins, the bus connector pluggably receiving the first pins to as to electrically connect together the first pins, the auxiliary terminal connector having a first additional bus connector carried by the support base for pluggably receiving the second pins so as to electrically connect together the second pins and a second additional bus connector carried by the support base for pluggably receiving the third pins so as to electrically connect together the third pins.

4. The apparatus of claim 1, wherein the bus connector pin is adapted to secure the bus connector to the support base.

5. The apparatus of claim 1, wherein the means for securing the auxiliary terminal connector to the circuit breaker panel includes means for removably securing the auxiliary terminal connector to the circuit breaker panel.

6. The apparatus of claim 1, wherein the means for securing the auxiliary terminal connector to the circuit breaker panel includes a connection formed integral with the circuit breaker panel.

7. The apparatus of claim 1, wherein the bus connector is provided with an independently resiliently biased region for each signaling connector pin.

8. An apparatus for receiving a plurality of pluggable circuit breakers each having first and second circuit breaker posts and a signaling connector pin for permitting the status of the circuit breaker to be monitored, the apparatus comprising a circuit breaker panel adapted to receive the plurality of pluggable circuit breakers for permitting electrical power connections to the first and second circuit breaker posts, an auxiliary terminal connector and means for securing the auxiliary terminal connector to the circuit breaker panel, the auxiliary terminal connector having a support base provided with front and rear sides and an electrically conducting bus connector disposed substantially on the front side of the support base and adapted for pluggably receiving the signaling connector pin of each of the plurality of pluggable circuit breakers and electrical means electrically coupled to the bus connector for permitting remote monitoring of the status of the plurality of pluggable circuit breakers, the bus connector extending longitudinally along the support base and being tulip-shaped in cross section, the tulip shape having a base portion and two lateral portions extending from the base portion, the two lateral portions converging towards each other to form a contact portion and diverging from the contact portion to form a V-shaped opening at a predetermined distance from the base portion, the electrical means including at least one electrically conducting bus connector pin formed as an extension of the base portion of the bus connector and protruding from the base portion into the support base to the rear side of the support base, whereby the bus connector permits a solderless electrical connection to the signaling connector pins.

9. The apparatus of claim 8, wherein at least one of the lateral portions of the bus connector is provided with a slit extending from the opening towards the base portion.

10. The apparatus of claim 8, wherein each circuit breaker has first, second and third signaling connector pins, the bus connector pluggably receiving the first pins to as to electrically connect together the first pins, the auxiliary terminal connector comprising a first additional bus connector for pluggably receiving the second pins so as to electrically connect together the second pins and a second additional bus connector for pluggably receiving the third pins so as to electrically connect together the third pins.

11. The apparatus of claim 8, wherein the electrical means includes a plurality of bus connector pins and wherein the support base comprises a rigid insulating material extending between the front and rear sides of the support base and having a first pattern of holes mating with the bus connector pins, the holes passing through the rigid insulating material from the front side to the rear side, at least one electrically conductive strip formed in the insulating material substantially at the front side, the holes of the first pattern passing through the conductive strip, and an electrical trace formed substantially on the rear side of the support base, each trace having a first end disposed at one hole of the first pattern and a second end disposed at a hole of a second hole pattern formed in an output region of the support base, the respective bus connector pin and the trace forming a continuous electrical path between the bus connector, the conductive strip and the output region.

12. An apparatus for receiving a pluggable circuit breaker having first and second circuit breaker posts and a signaling connector pin for permitting the status of the circuit breaker to be monitored, the apparatus comprising a circuit breaker panel adapted to receive the pluggable circuit breaker for permitting electrical power connections to the first and second circuit breaker posts, an auxiliary terminal connector and means including an adhesive for securing the auxiliary terminal connector to the circuit breaker panel, the auxiliary terminal connector having an electrically conducting bus connector adapted for pluggably receiving the signaling connector pin and electrical means electrically coupled to the bus connector for permitting remote monitoring of the status of the pluggable circuit breaker whereby the bus connector permits a solderless electrical connection to the signaling connector pin.

13. The apparatus of claim 12, wherein the bus connector is provided with an independently resiliently biased region for the signaling connector pin.

14. The apparatus of claim 12 for use with a plurality of pluggable circuit breakers, wherein the auxiliary terminal connector has one bus connector for pluggably receiving the signaling connector pin of each of the plurality of pluggable circuit breakers whereby the signaling connector pins are electrically connected by the one bus connector.

15. The apparatus of claim 14, wherein each circuit breaker has first, second and third signaling connector pins, the bus connector pluggably receiving the first pins to as to electrically connect together the first pins, the auxiliary terminal connector having a first additional bus connector carried by the support base for pluggably receiving the second pins so as to electrically connect together the second pins and a second additional bus connector carried by the support base for pluggably receiving the third pins so as to electrically connect together the third pins.

16. The apparatus of claim 14, wherein the auxiliary terminal connector comprises a support base, and wherein the bus connector extends longitudinally along the support base and is tulip-shaped in cross section, the tulip shape having a base portion and two lateral portions extending from the base portion, the two lateral portions converging towards each other to form a contact portion and diverging from the contact portion to form a V-shaped opening at a predetermined distance from the base portion.

17. The apparatus of claim 16, wherein at least one of the lateral portions of the bus connector is provided with a slit extending from the opening towards the base portion.

18. The apparatus of claim 16, wherein the support base comprises front and rear sides, the bus connector being disposed substantially on the front side, the electrical means extending from the bus connector to the rear side.

* * * * *